UNITED STATES PATENT OFFICE.

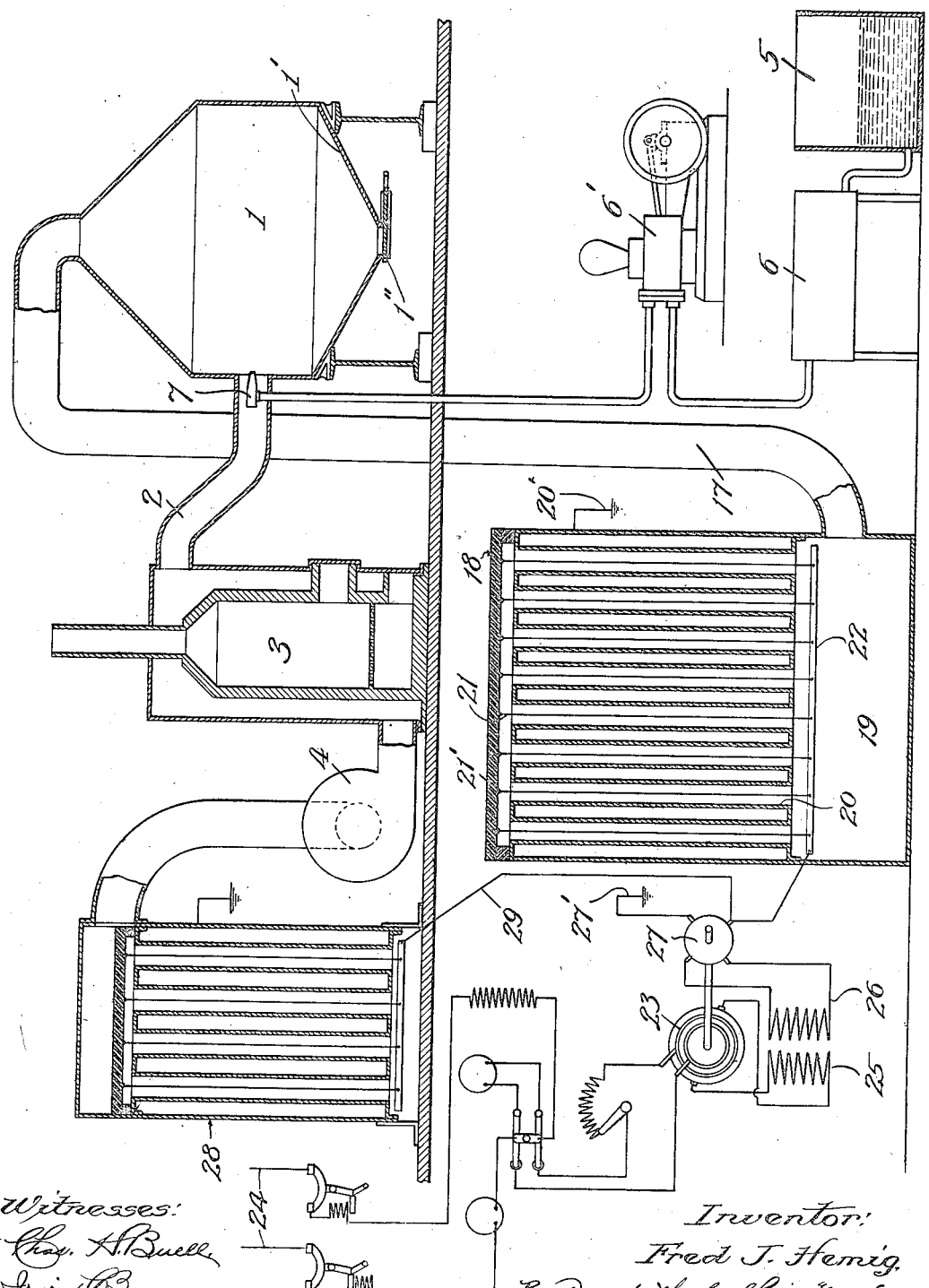

FRED J. HEMIG, OF CHICAGO, ILLINOIS, ASSIGNOR TO CROWN MALTOSE COMPANY, OF CHICAGO, ILLINOIS, A CORPORATION OF ILLINOIS.

MALTOSE AND PROCESS OF MAKING THE SAME.

1,214,160. Specification of Letters Patent. Patented Jan. 30, 1917.

Application filed February 12, 1915. Serial No. 7,871.

*To all whom it may concern:*

Be it known that I, FRED J. HEMIG, a citizen of the United States, residing at Chicago, in the county of Cook and State of Illinois, have invented a new and useful Improvement in Maltose and Processes of Making the Same, of which the following is a specification.

My invention relates to non-hygroscopic powdered maltose and a commercially practical method of making the same.

Dry or powdered maltose produced by various processes has been for some time well known and obtainable in small quantities and at a relatively high price. This powdered maltose hitherto known, however, has been unsuitable for economic or industrial purposes, both by reason of its physical form and because of the high cost of production according to the methods hitherto used in its manufacture. More particularly, it may be stated that the powdered maltose obtainable on the market prior to my invention is in the form of a crystalline, or if ground, an amorphous powder, hygroscopic, and so expensive as to be economically unsuitable for any ordinary industrial purpose.

By my invention I provide a new and commercially feasible process of producing dry, powdered maltose at a very slight expense, and the resultant product differs considerably in its physical characteristics from any previously known form of powdered maltose. Thus, the product of my invention is a dry, non-hygroscopic powder, the individual particles of which are of generally spheroidal form, entirely uncaramelized, very readily soluble in water, and capable of being stored, transported and handled without special care and without deterioration.

It has been for some time well understood by chemists skilled in the art that maltose forms a most excellent yeast food, and that it further has the property of softening and increasing the absorbing powers of gluten. These advantageous properties of maltose, although previously known, have been of little industrial benefit by reason of the prohibitive cost of the maltose and the difficulty of handling the product due to its physical form and characteristics. By my invention these valuable properties of the maltose may be taken advantage of to the fullest extent in ordinary processes of food manufacture, such as the baking of bread, and in such commercial use of my invention I have discovered many other valuable properties and advantages of my new product in the arts. In the baking of bread, for instance, I have discovered that my product possesses the following marked advantages over any material previously known to bakers. As a specific illustration I may refer to bread dough containing my new product and mixed according to the following formula, for example: To each barrel of wheat flour of 196 pounds add 1½ pounds of maltose, 16 gallons of water, 2 pounds of yeast, 3 pounds of salt, 3½ pounds of sugar, 5 pounds of lard.

A bread dough mixed, for example, according to the preceding formula is found to possess the following advantages:

1. Maltose being the most desirable yeast food and thereby producing during the fermentation in the dough an exceptionally large volume of carbon dioxid which expands and aerates the dough, there results a decided increase in the size of the loaf.

2. The "bloom", meaning the general appearance of the crust, is as near to the perfection required by the highest standard as is possible, thereby resulting in a rich and appetizing general appearance of the loaf.

3. A whiter loaf will result owing to the thorough aeration by carbon dioxid.

4. A finer texture of the crumb, owing to the softening of the gluten and the increased generation of yeast cells.

5. Less time required in proofing the loaves, due to the greater number of yeast cells in the dough.

6. A better "spring" in the oven which results from the increased number of yeast cells in the dough and the quicker and more uniform expansion when subjected to heat.

7. A superior flavor, the better nourishing of the yeast, preventing the formation of noxious by-products during fermentation.

8. A decided saving in sugar and shortening since the maltose itself replaces the sugar as a yeast food and the chemical action of the maltose in making the gluten more tender is more efficient than the action of lard, or other shortening used for the same purpose.

9. The bread keeps longer without drying out, due to the fact that the initial moisture content has been increased by increasing the absorbing powers of the gluten.

10. Since the mechanical mixing of the dough acts only for a short time and cannot be continued during the entire fermentation, whereas the maltose is active in softening and developing the gluten continually up to the time of baking, the use of high speed mixers previously recommended for the purpose of mechanically acting upon the gluten to soften it is wholly unnecessary when my product is employed.

11. Economy of manufacture, that is, more loaves are obtainable per barrel of flour by the use of my product than by any other known product of making the dough. This result follows from the action of my maltose in increasing the absorbing power of the gluten and thereby permitting the use of a considerably larger proportion of water in mixing the dough.

12. The unquestioned advantage, from a manipulative standpoint, of employing a dry or powdered product instead of the viscous liquids previously employed.

From the foregoing it will be understood that by my invention I have rendered possible the wide industrial use of maltose, and that in such industrial use of my new product I have discovered numerous additional advantageous properties of the maltose, and have provided a means by which these properties may be taken advantage of for ordinary industrial purposes.

My process for producing the new physical product referred to in the foregoing may be best described in connection with the accompanying drawing which illustrates diagrammatically a form of apparatus suitable for carrying out the process on a commercial scale.

In general, it may be said that my process consists in mixing soluble starch and some product containing diastatic enzyms such as malted barley, for instance, in a water solution in a vat, maintaining the mixture at a temperature suitable for the action of the enzyms and for a long enough period to permit of the conversion of the starch into soluble maltose, filtering to remove insoluble matter, spraying the filtrate into a desiccating chamber under such pressure and by such spraying means as to produce a mist or vapor of the most minute particles supplying heated or unsaturated air to the desiccating chamber in sufficient volume to instantaneously evaporate the sprayed filtrate and collecting the resultant dry powder.

An apparatus suitable for carrying on this process consists essentially of a desiccating-chamber 1 having a supply-pipe 2 for heated dry air, the pipe leading to a jacketed furnace 3 through the jacket of which the air is forced by a pump 4. The filtrate from the vat 5, after passing through a filter-press, shown diagrammatically at 6, and through a high pressure hydraulic pump 6', reaches a spraying nozzle 7 located in the outlet end of the air-supply pipe 2 and spraying inwardly into the desiccating-chamber 1. Within this chamber the mist or spray will be instantaneously evaporated, and a considerable proportion of the dry maltose will settle downwardly to the bottom of the chamber 1. For removing this portion of the maltose which settles on the bottom of the chamber 1, I form the latter as a downwardly converging cone 1' having an outlet gate 1'' at its apex, so that the desiccated material may fall by gravity to the outlet gate, and from the latter be discharged into a receptacle. A large proportion of the maltose fails to settle within the chamber 1, however, and is carried off through the air-outlet pipe 17 leading from the top of the chamber 1, and through the pipe is discharged into an electro-static collector, designated 18. This collector comprises a bottom chamber 19 and a plurality of vertical passages 20, the walls of which are of metal or other conducting material, and grounded, as shown at 20'. A plurality of conductor-wires 21 are suspended from the insulated support 21' and extend downwardly through the passages 20, all of the conductor-wires being connected at their bottoms with a bus-bar 22 which in turn, is connected to a rectifier or commutator 27 carried by the shaft of a motor generator 23, which receives direct current from a line circuit 24, and on its alternating current side is in circuit with the primary 25 of a step-up transformer, the secondary 26 of which is connected with the commutator 27. One of the brushes of the latter is grounded, as indicated at 27' in the drawing, and another brush connected to the bus-bar 22. By this system, the conductors 21 within the passages 20 are kept constantly charged at a very high potential, i, e., in the neighborhood of 30,000 volts. As the heated air carrying in suspension the fine particles of dry maltose passes vertically upward through the passages 20, the maltose particles become charged by contact with the conductors 21 and are attracted to the grounded walls of the passages 20, upon which they are deposited. By this means, substantially the whole of the suspended solid matter is removed from the air current before the same escapes from the upper ends of the air passages 20. At suitable intervals the deposited powdered maltose may be scraped or shaken from the walls of the passages 20 into the bottom chamber 19, from which it may be removed in any ordinary manner.

In connection with the electrical apparatus employed, for removing from the air the suspended particles of maltose, I find it desirable to employ a similar apparatus for the purpose of removing dust particles and other solid impurities from the air used in my desiccator prior to its introduction thereinto. With this in mind, I connect an air purifier 28 identical in construction with the apparatus 18 to the intake side of the pump 4, and this apparatus I energize from the commutator 27 by means of a conductor 29. The air-purifying apparatus 28 acts in the same manner as the collector apparatus 18 to remove from the inflowing air prior to its entry into the pump 4 dust and other foreign matter which is held in suspension in the air. By thus purifying the air before its entry into the desiccating chamber, I avoid contaminating the desiccated product.

In carrying out my process by the use of the above-described apparatus, the following procedure is employed. A mixture is made within the vat 5, said mixture consisting of about 80 per cent. water-soluble starch and 20 per cent. barley malt. The starch employed may be gelatinized corn starch which has been partially cooked or digested with a re-agent, and subsequently dried. When so treated, upward of 94 per cent. of the starch is soluble in cold water. Other varieties of starch may be used with equal facility, however, it being only essential that the starch be largely soluble in water. The barley malt employed should be as high in diastatic activity as possible. Barley malt showing a Lintner test of about 160 degrees is recommended. The mixture of barley malt and soluble starch is permitted to soap or steep in the vat until the conversion of the starch into maltose has reached its maximum. The length of time required for this conversion will obviously be dependent upon the solubility of the starch, the diastatic activity of the malted barley, the proportion of starch to diastase, and upon the temperature and mechanical conditions under which the conversion takes place. I find that in using a gelatinized corn starch in the proportion of 80 per cent. and barley malt of a Lintner test of 162 degrees, in the proportion of 20 per cent., the mass becomes effectively converted when maintained at a temperature upward of 140 degrees for a period of about ten hours, without stirring or other mechanical means being employed to hasten the conversion. At the end of the period of conversion, I may subject the mixture for about one-half hour to a temperature of approximately 160 degrees F., for the purpose of effectually killing the diastatic enzyms. At the end of this treatment, the maltose syrup is ready for desiccation, and the vat may now be connected through the filter press with the pump, by which it is forced under an exceedingly high pressure, preferably about 1800 pounds to the square inch, through the spray nozzle 7 and into the desiccation chamber 1. In this latter chamber I prefer to employ air heated to a temperature in the neighborhood of 325 degrees F. About 40 to 50 per cent. of the dry product will be deposited in the bottom of the desiccation chamber 1, while substantially the whole of the remainder will be caught by the electro-static collector 18. The product is a fine, whitish powder which, on chemical analysis, shows a maltose equivalent upward of 90 per cent. and is non-hygroscopic to a marked degree. A specimen analysis of the powdered maltose produced by my process is as follows:

| | Per cent. |
|---|---|
| Moisture | 2.26 |
| Reducing sugar as maltose | 92.00 |
| Dextrin | .40 |
| Starch | .00 |
| Other solids | 5.34 |
| | 100.00 |

Diastatic activity _____ 3.7 degrees Lintner.

Under the microscope, powdered maltose produced in accordance with this process is found to consist of very fine particles characterized by their spherical curvature. Some of the particles are solid spheres, others are hollow spheres, and still others, which may have been broken, are in the form of segments or sectors of spheroidal curvature. My product, therefore, differs in a marked manner from any previously known dry maltose, since, in so far as I have been able to ascertain, such previous products as maltose (Merck's C. P.) have either been in the form of crystalline or angular granules, or, if finely pulverized, in the form of an amorphous powder. Whether wholly resultant upon the different physical form or not, I find that the powder produced in accordance with my method is greatly superior to the previously known malt sugar products, in that it is markedly non-hygroscopic.

The malt sugar produced in accordance with my process is preferably almost entirely devoid of diastatic activity, the preferred process which I have described above giving a product having a Lintner test of about 4 degrees. It will be understood, however, that the diastatic activity of my resultant product is readily controllable, and may be as high as that of the original mixture, or may be reduced to zero, if desired, the diastatic activity being dependent entirely upon the degree and duration of heating employed. Thus if the vat be kept at a temperature below 140 degrees, substantially all of the diastatic enzyms present in the mixture will appear unchanged in the dry powdered maltose, while if the vat be heated to a temperature upward of 160 degrees, practically all of the diastatic enzyms will be killed. It will be understood, also that while I prefer to use a considerable percentage of barley malt for the purpose of supplying the diastase necessary to effect a conversion of the starch, the diastatic enzyms might be obtained from some other source, for instance, from certain fungi. The malted barley forms no essential part of my invention, except in so far as it constitutes a most convenient and preferred form of introducing into the mixture the diastatic enzyms.

In general, it may be stated that my invention contemplates the use of a mixture containing soluble starch and diastatic enzyms, and that either of these constituents may be obtained from any desired source.

While I have described in considerable detail an exact and preferred process for carrying out my invention, and I further define the exact physical and chemical characteristics of my product as obtained by this process, I wish it to be understood that the specific details, both as to the process and the exact characteristics of the product are to be regarded as illustrative only and for the purpose of making my invention more clear, and that I do not regard my invention as limited to these specific features, except in so far as such limitations are included within the terms of the following claims, in which it is my intention to claim all novelty inherent in the invention as broadly as is permissible in view of the prior art.

What I claim as new and desire to secure by Letters Patent is:—

1. Maltose in the form of a finely-divided powder the individual particles of which are of generally spheroidal curvature.

2. Maltose in the form of a non-hygroscopic, finely-divided powder, the individual particles of which are of generally spheroidal curvature.

3. A finely divided powder the ultimate particles of which are of generally spheroidal form and consists of upward of 90 per cent. reducing sugars calculated as maltose.

4. A finely divided, whitish, non-hygroscopic powder the individual particles of which are of generally spheroidal curvature and consists essentially of uncaramelized malt sugar.

5. The herein described process which consists in subjecting starch in solution to the action of diastatic enzyms to produce a substantially pure maltose solution, spraying the resultant solution in a finely divided form into a desiccating atmosphere, thereby instantly removing the water to form solid spheroidal particles, and collecting such articles.

6. The herein described process which consists in transforming starch in solution into maltose by the action of diastatic enzyms, spraying the solution thus formed in a finely divided condition into a desiccating atmosphere, and thereby instantly removing the water to form spheroidal solid particles which are essentially maltose, the desiccation being performed at such speed and temperature as not substantially to caramelize the maltose, and collecting the particles thus formed.

7. The herein described process which consists in transforming starch in solution into substantially pure maltose by the action thereon of diastatic enzyms, spraying the resultant solution into a desiccating atmosphere, passing the gas constituting such atmosphere between oppositely charged electrodes, and passing the gases issuing from the desiccating atmosphere between similar electrodes, whereby to collect the solid particles resulting from the desiccation.

8. The herein described process which consists in transforming starch in solution into substantially pure maltose by the action thereon of diastatic enzyms, spraying the resultant solution into a desiccating atmosphere instantly to remove therefrom the water and form solid spheroidal particles, charging said particles while in gaseous suspension with static charges, and collecting the particles on an electrode of opposite polarity from that of their respective charges.

FRED J. HEMIG.

In presence of—
FRANK A. HOWARD,
G. ARTHUR BURR.